MEMORY INCLUDING DIFFERENTIALLY WOUND CORES GENERATING TIMING PULSES

Filed Sept. 16, 1964

INVENTOR.
RAY L. RILEY,
BY
Robert Thompson
ATTORNEY.

United States Patent Office 3,430,214

Patented Feb. 25, 1969

3,430,214
MEMORY INCLUDING DIFFERENTIALLY WOUND CORES GENERATING TIMING PULSES

Ray L. Riley, Los Angeles, Calif., assignor to Hughes Aircraft Company, Culver City, Calif., a corporation of Delaware Filed Sept. 16, 1964, Ser. No. 396,921
U.S. Cl. 340—174 11 Claims
Int. Cl. G11b *5/20*

ABSTRACT OF THE DISCLOSURE

A strobe pulse is obtained by interrogating at the same time a memory is interrogated, a pair of digital memory elements, one of which is preset to a binary "1" condition, and the other of which is preset to a binary "0" condition. The peak of the amplitude difference between the resulting binary "1" and binary "0" sense signals is detected at a circuit, whereupon a strobe pulse is generated at the precise time that the amplitude difference between the "1" sense signal and the "0" sense signal from the memory elements is at a peak. This strobe pulse is then used to ungate a memory sense detector so that sense signals from the memory can be detected at the optimum discrimination time.

Figure 1:
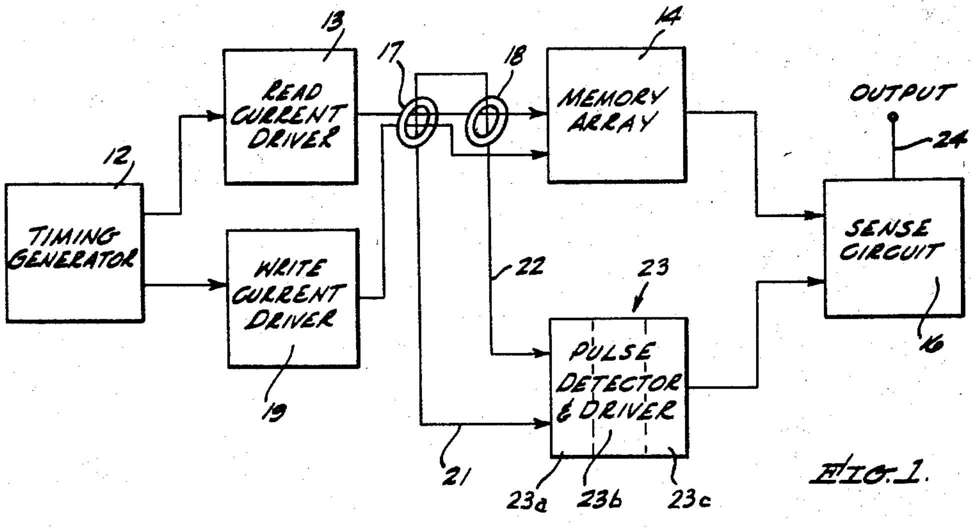

This invention relates to a means and a method for dynamically obtaining optimum timing for a discrimination between electrical sense signals received from a digital memory during interrogation thereof.

One of the primary concerns in organizing and constructing high-performance digital memories is obtaining a proper timing relationship between electrical signals during a digital memory interrogation process. Unless proper timing of the memory sense (output) signals is obtained it is possible for a memory sense circuit to improperly identify or differentiate between a binary "1" sense pulse and a binary "0" sense pulse.

Heretofore, a predetermined set of fixed time relationships have been selected between electrical signals fed into and received from a memory array so that narrow strobe pulses were timed with respect to a predicted optimum time during predicted occurrence of the memory sense signals. That is, the strobe pulses were preset to occur at the predicted time of maximum amplitude difference between binary "1" and binary "0" sense signals.

The difficulty with a preset strobe signal arrangement was that certain factors such as thermal variations, component operating tolerances, power supply variations, and the like, often affected the predicted relationship of electrical sense signals generated by the memory during interrogation. That is, the sense signals from the memory could have a greater or smaller magnitude than predicted or could occur sooner or later than predicted in relation to a preset strobe pulse, whereupon the preset strobe pulse would no longer be optimumly timed. As a result, it would be possible for an incorrect discrimination to occur between binary "1" and binary "0" sense signals received at a memory sense circuit.

Accordingly, it is an object of this invention to provide a means and method for obtaining optimum timing relationship between sense signals received from a memory and narrow strobe pulses.

Another object is to provide a means and method for dynamically timing strobe pulses with relation to an optimum time for discriminating between two levels of sense pulses from a digital memory.

Still another object is to provide a means for dynamically timing strobe pulses with relation to sense pulses from a memory in which the operation is not substantially degraded by the effects of factors such as thermal variations, component operating tolerance, power supply variations, and the like.

The above and other objects are accomplished by providing a memory array which is selectively interrogated by input signals, hereinafter referred to as drive signals or pulses, from a selectively timed memory driver whereupon the output signals from the memory array, hereinafter referred to as sense signals or pulses, are coupled to a memory sense amplifier. The sense amplifier discriminates between high amplitude binary "1" sense signals, and relatively low amplitude binary "0" sense signals received from the memory array.

To obtain optimum timing at which the memory sense amplifier is to discriminate between a binary "1" and a binary "0" sense signal, strobe pulses having a short duration relative to the duration of the read pulses are generated and applied to ungate the sense amplifier when the maximum amplitude difference between a binary "1" and binary "0" sense pulse occurs. This optimum timing relationship between sense pulses is obtained by providing two typical memory elements, such as magnetic cores, one of which is preset to a binary "1" state and the other of which is preset to a binary "0" state. The read signal which interrogates the memory array is also used to simultaneously interrogate these two memory elements thereby simultaneously generating a typical binary "1" sense signal and a typical binary "0" sense signal on separate electrical lines. A resultant pulse having an amplitude equal to the amplitude difference between these two sense signals from the typical memory elements is applied to a differentiator which initiates a strobe pulse at the precise time that the amplitude differential between the "1" sense signal and the "0" sense signal is at a peak. This strobe pulse is then applied to ungate the memory sense circuit so that the sense signals from the memory array can be detected and amplified at the optimum time.

Figure 2:
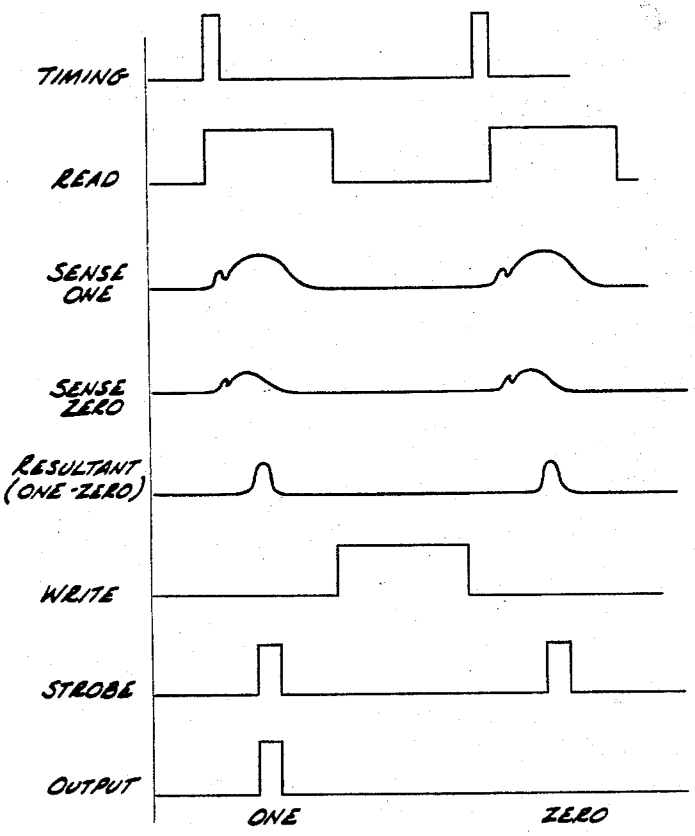

Other features, objects, and advantages of this invention will become apparent upon reading the following detailed description of one embodiment of the invention and referring to the accompanying drawings in which:

FIG. 1 is a block diagram illustrating the operational features and arrangements of components of the pulse timing means; and FIG. 2 is a graph illustrating the time relationships between waveforms of: typical timing pulses, memory read pulses and write pulses, typical binary "1" and binary "0" sense signals, and strobe pulses.

Generally, memory interrogation occurs as follows. When a timing generator 12 generates a timing pulse, a read current driver is energized to produce a read pulse having a high current magnitude and a substantially square waveform. This read pulse is applied to interrogate a memory array 14 whereupon one of two sense pulses is generated. The sense signal for a stored binary "1" has a high amplitude rounded waveform and the sense signal for a stored binary "0" has a low amplitude rounded waveform. The sense signal from the memory 14 is applied to a sense circuit 16 which discriminates between binary "1" sense signals and binary "0" sense signals, and can amplify the binary "1" signal to generate an output pulse having a substantially square waveform.

The disadvantages of a straightforward read-sense memory interrogation is that certain factors such as thermal variations, component operating tolerances, and power supply variations can affect both the amplitude and the timing relationship of the sense pulses received from the memory 14. Since a binary "0" signal, herinafter referred to as ZERO, does have an amplitude component, it is possible for the sense circuit 16 to improperly distinguish between a ZERO and a binary "1" pulse (hereinafter a binary "1" pulse will be referred to as ONE). Thus, it is preferable to discriminate between ONE and ZERO at a time when the amplitude difference between the two pulses is greatest.

Referring more specifically to the components of FIG. 1 and the graph of FIG. 2, the timing generator 12 continually generates timing pulses which are equally spaced (2 to 5 microseconds) and have a relatively short duration. One timing circuit which can perform this operation is disclosed in Pulse and Digital Circuits by Millman and Taub, published by McGraw-Hill, 1956, pp. 272-284.

The read current driver 13 is connected to be actuated by the timing pulses from the timing generator and generates read pulses having a square waveform of a relatively long duration and a high current magnitude starting at the time of receiving the timing pulses. A read current driver which can perform this operation is disclosed in Digital Applications of Magnetic Devices by Meyerhoff et al., published by Wiley, 1960, pp. 192-199.

The memory array 14 is connected to be selectively interrogated by the read pulse from the read current driver 13 so that a specific memory element, such as a magnetic core (not shown), is interrogated. The memory array 14 can be of the type disclosed on pages 359-451 in the above-referenced Digital Applications of Magnetic Devices. In order to simplify the description of the circuit it should, of course, be understood that the means for selecting the specific memory element can be a conventional register or other selection means.

When a specific core is interrogated by the read signal, one of two sense pulses, each having rounded waveforms, is generated. If the interrogated memory element contains a ONE store the sense pulse has a high amplitude waveform, whereas if a memory element has a ZERO store the sense pulse has a low amplitude waveform. Referring to the sense pulse waveforms graphically illustrated in FIG. 2, the low amplitude ZERO pulse reaches its peak amplitude prior to the higher amplitude ONE pulse and quickly decays back to its quiescent condition. If the discrimination operation of the sense circuit 16 can be made to occur at the time of greatest amplitude difference, an optimum timing of the sense circuit 16 can be obtained. Thus by taking the amplitude difference between these two pulses, a resultant pulse can be obtained which has an amplitude peak which may or may not be coincident with the peak of the ONE pulse.

To obtain this resultant differential amplitude pulse, the read current pulse line which is used to interrogate the memory array 14 is threaded to interrogate a pair of typical memory elements such as two magnetic memory cores 17 and 18. Of course, it should be understood that other typical memory elements such as thin films can be used and that the particular memory element used need only be equivalent in form or operating characteristics to the memory elements contained within the memory array 14. Prior to each read current pulse, one of the magnetic cores 17 is preset to a ONE store condition while the other magnetic core 18 is left in a ZERO store condition. The ONE is written into core 17 by a conventional write current driver 19 which generates a write pulse having a square waveform and relatively high current magnitude during the time interval between read pulses. A write current driver which can perform this function is disclosed in the previously referenced Digital Applications of Magnetic Devices.

With the two typical memory elements 17 and 18 set up in a ONE and ZERO store condition, respectively, the read pulse simultaneously interrogates the memory elements thereby generating a typical ONE sense pulse and a typical ZERO sense pulse on sense line 22, which is threaded through both of the cores. To provide a resultant sense signal which has an amplitude equal to the difference between the amplitudes of the ONE pulse and the ZERO pulse, the sense line 22 can be threaded in relatively opposite directions through the memory elements 17 and 18, respectively. As a result, the ZERO pulse partially cancels the ONE pulse to provide a resultant pulse having an amplitude equal to the amplitude difference between the two pulses. These two partially cancelling sense pulses are then used to initiate a strobe pulse at the exact time that the amplitude differential between the ONE and the ZERO pulses is at a peak.

To generate the strobe pulses, a pulse detector and strobe pulse driver 23 receives the two typical sense signals from cores 17 and 18 on sense line 22 and generates a relatively short duration strobe pulse when the amplitude difference between the two signals is at a maximum. The resultant pulse signal generated across sense line 22 can be amplified by a differential amplifier stage **23*a* and then differentiated by a differentiator stage 23*b*. An amplitude comparator or multiar stage 23*c* can then generate a strobe pulse when the differentiated signal reaches zero volts or a crossover point such as occurs when the resultant pulse input signal reaches a peak amplitude. The following typical circuits which can perform these electrical operations are disclosed in Waveforms by Chance et al., vol. 19, Radiation Laboratories Series 1949: the differential amplifiers on pp. 358-363, especially FIG. 9–43 on page 360; the differentiators on p. 648-666, especially FIG. 18–31 on pp. 660; and the amplitude comparators on pp. 335-348, especially the multiar of FIG. 9–20 on pp. 343. The output strobe pulses from the pulse detector and strobe pulse driver 23 operates to control when the sense pulse from the memory array 14** is to be subjected to discrimination.

Discrimination between ONE and ZERO sense signals received from the memory array 14, is provided by the sense circuit 16 which in turn is ungated only when a strobe pulse is received from the strobe pulse driver 23. When the sense circuit 16 is ungated, the sense signal is amplified only if its amplitude is above a predetermined threshold voltage. Since the amplitude of any ZERO sense pulses will have dropped below their peaks, their amplitude is relatively low at the time of maximum amplitude difference between ONES and ZEROS. Thus the ZEROS are effectively discriminated against and are not transmitted. Circuitry which would perform the sensing and amplification operation is disclosed in the Transactions of the IRE, Vol. EC 11, Apr. 1962, entitled "Design of Memory Sense Amplifiers" by Goldstick et al., pp. 236–253. The amplified pulses from the sense circuit have a square waveform and a predetermined pulse duration which is compatible with any pulse processing circuitry connected to the output terminal 24.

While the salient features have been illustrated and described with respect to particular embodiments, it should be readily apparent that modifications will be made within the spirit and scope of the invention and it is therefore not desired to limit the invention to the exact details shown and described.

What is claimed is:

1. A device for timing the interrogation of a digital memory comprising:

an interrogation means being operable to generate a read pulse, said interrogation means being coupled to interrogate the digital memory;

a gated sense means connected to receive sense pulses from the digital memory and being operable to selectively conduct sense pulses generated during interrogation of the digital memory;

a first and second memory element having the same characteristics as those contained in the digital memory, said memory elements being coupled to be interrogated by said interrogation means, one of said memory elements being preset to a ONE stored condition and the other of said memory elements being preset to a ZERO stored condition whereby a ONE sense pulse and a ZERO sense pulse are simultaneously generated when said memory elements are interrogated; and a strobe pulse means connected to receive the ONE and the ZERO sense pulses from said memory elements, said strobe pulse means being operable to generate a strobe pulse when the difference between the received ONE and ZERO sense pulses is at about a maximum, the generated strobe pulse being coupled to ungate said sense means for conduction of the sense pulses from the digital memory.

2. A circuit for optimally timing interrogation of a digital memory comprising:

a read pulse generator connected to interrogate the digital memory;

a gated sense means connected to sense a pulse generated by the digital memory during interrogation thereof, said gated sense means being operable to block or conduct the sense pulse;

a first and second memory element of the type contained in the memory, said memory elements being coupled to be simultaneoulsy interrogated by said read pulse generator for simultaneously generating a ONE and a ZERO sense pulse respectively; and a strobe means connected to receive the ONE and the ZERO sense pulses from said memory element, said strobe means being further connected to ungate said gated sense means for conduction of the sense pulse from the digital memory when the amplitude difference between the ONE and the ZERO sense pulse is at about a maximum.

3. In a digital circuit of the type including a memory array, a read pulse generator means connected to interrogate the memory array, and a sense pulse discriminator means connected for receiving sense pulses from the memory array during interrogation, the improvement comprising:

a pair of memory element means connected to be simultaneously interrogated by the read pulse generator means, one of said memory elements being preset to a ONE store condition and the other said memory element being preset to a ZERO store condition whereby a ONE sense pulse and a ZERO sense pulse are simultaneously generated during interrogation;

a differential means connected to said pair of memory element means for obtaining a resultant pulse having an amplitude equal to the amplitude difference between the ONE sense pulse and the ZERO sense pulse; and a strobe pulse generator means connected to receive the resultant pulse from said differential means for generating a strobe pulse when the amplitude of the resultant pulse is at a peak, said probe pulse generator means being further connected to the sense pulse discriminator means for initiating an output signal therefrom upon simultaneous occurrence of a ONE sense pulse and the strobe pulse.

4. In a digital circuit of the type including a memory array, a read pulse generator means connected to interrogate the memory array, and a sense pulse discriminator means connected for receiving sense pulses from the memory array during interrogation, the improvement comprising:

a pair of memory element means connected to be simultaneously interrogated by the read pulse generator means, one of said memory elements being preset to a ONE store condition and the other said memory element being preset to a ZERO store condition whereby a ONE sense pulse and a ZERO sense pulse are simultaneoulsy generated during interrogation;

differential means connected to said pair of memory element means for obtaining a resultant pulse having an amplitude equal to the amplitude difference between the ONE sense pulse and the ZERO sense pulse; and strobe pulse generator means connected to receive the resultant pulse from said differential means for generating a strobe pulse when a differentiation of the resultant pulse is at a zero level, said strobe pulse generator means being further connected to the sense pulse discriminator means for initiating an output signal therefrom upon simultaneous occurrence of a ONE sense pulse and the strobe pulse.

5. In a digital circuit of the type including a memory array, a read pulse generator means connected to interrogate the memory array, the improvement comprising:

a sense pulse discriminator means connected for receiving sense pulses from the memory array during interrogation;

a pair of memory element means connected to be simultaneously interrogated by the read pulse generator means, one of said memory elements being preset to a ONE store condtion and the other said memory element being preset to a ZERO store condition whereby a ONE sense pulse and a ZERO sense pulse are simultaneously generated during interrogation;

a differential means connected to said pair of memory element means for obtaining a resultant pulse having an amplitude equal to the amplitude difference between the ONE sense pulse and the ZERO sense pulse; and a strobe pulse generator means connected to receive the resultant pulse from said differential means for generating a strobe pulse when a differentiation of the resultant pulse is at a zero level, said strobe pulse generator means being further connected to said sense pulse discriminator means for intiating an output signal therefrom upon simultaneous occurrence of a ONE sense pulse and the strobe pulse.

6. In a digital circuit of the type including a memory array, a read pulse generator means connected to interrogate the memory array, the improvement comprising:

a sense pulse discriminator means connected for receiving sense pulses from the memory array during interrogation;

a pair of memory element means connected to be simultaneously interrogated by the read pulse generator means, one of said memory elements being preset to a ONE store condition and the other said memory element being preset to a ZERO store condition whereby a ONE sense pulse and a ZERO sense pulse are simultaneously generated during interrogation;

a differential means connected to said pair of memory element means for obtaining a resultant pulse having an amplitude equal to the amplitude difference between the ONE sense pulse and the ZERO sense pulse; and a strobe pulse generator means connected to receive the resultant pulse from said differential means for generating a strobe pulse when the amplitude of the resultant pulse is at a peak, said strobe pulse generator means being further connected to said sense pulse discriminator means for initiating an output signal therefrom upon simultaneous occurrence of a ONE sense pulse and the strobe pulse.

7. A device for obtaining a time signal for optimal discrimination of digital pulses comprising:

a first and a second memory element means, one of said memory element means being preset to a ONE store and the other said memory element means being preset to a ZERO store;

pulse drive means connected to simultaneously interrogate said memory element whereby a ONE and a ZERO sense pulse is simultaneously generated;

a differential means connected to receive the ONE and the ZERO pulses and being operable to generate a resultant pulse having an amplitude equal to the amplitude difference between the ONE and the ZERO pulses; and time signal generator means connected to receive the resultant pulse and being operable to generate a signal pulse in response to a peak amplitude of the resultant pulse.

8. A device for obtaining a time signal for optimal discrimination of digital pulses comprisng:

a first and a second memory element means, one of said memory element means being preset to a ONE store and the other said memory element means being preset to a ZERO store;

pulse drive means connected to simultaneously interrogate said memory element whereby a ONE and a ZERO sense pulse is simultaneously generated;

a differential means connected to receive the ONE and the ZERO pulse for generating a resultant pulse having an amplitude equal to the amplitude difference between the ONE and the ZERO pulses;

a differentiating circuit connected to receive the resultant pulse and to generate a differentiated resultant pulse having a zero level signal at the amplitude peak of the received resultant pulse; and time signal generator means connected to receive the differentiated resultant pulse and being operable to generate a signal pulse in response to when the differentiated resultant pulse is at a zero level.

9. A device for obtaining a time signal for optimal discrimination of digital pulses comprising:

a first and a second memory element means;

write means connected to one of said memory element means for presetting said one memory element means to a ONE store condition, the other said memory element means being left in a ZERO store condition;

pulse drive means connected to simultaneously interrogate said memory element whereby a ONE and a ZERO sense pulse are simultaneously generated;

a differential means connected to receive the ONE and the ZERO pulses from the memory elements and being operable to generate a resultant pulse having an amplitude equal to the amplitude difference between the ONE and the ZERO pulses; and time signal generator means connected to receive the resultant pulse and being operable to generate the signal pulse in response to the peak amplitude of the resultant pulse.

10. A device for obtaining a time signal for optimal discrimination of digital pulses comprising:

a first and a second memory element means, one of said memory element means being preset to a ONE store and the other said memory element means being preset to a ZERO store;

pulse drive means connected to simultaneously interrogate said memory element whereby a ONE and ZERO sense pulse are simultaneously generated;

a sense line means coupled to said first and said second memory element to simultaneously receive the ONE and the ZERO pulses in a partial self-cancelling relationship for generating a resultant pulse having an amplitude equal to the amplitude difference between the ONE and the ZERO pulses; and time signal generator means connected to receive the resultant pulse and being operable to generate the signal pulse in response to the peak amplitude of the resultant pulse.

11. A method for discriminating between digital pulses by using two memory elements, the method comprising the steps of:

writing a ONE store in one of the memory elements;

maintaining a ZERO store in the other memory element;

simultaneously interrogating the two memory elements;

simultaneously sense the store condition of the two memory elements;

obtaining a resultant indication directly proportional to the difference between the sensed conditions of the two memory elements;

detecting the peak of the resultant indication; and discriminating between digital pulses only at the time of the detected peak.

References Cited

UNITED STATES PATENTS 3,181,132 4/1965 Amemiya ---------- 340—174

BERNARD KONICK, *Primary Examiner.*

V. P. CANNEY, *Assistant Examiner.*

U.S. Cl. X.R.

307—88